United States Patent
Zhou

(10) Patent No.: US 11,153,946 B2
(45) Date of Patent: Oct. 19, 2021

(54) CIRCUIT FOR LINEARLY DRIVING LED ILLUMINATION BASED ON MCU-CONTROLLED COLOR TEMPERATURE SWITCHING

(71) Applicant: Wuxi ORG Microelectronics Co., Ltd., Jiangsu (CN)

(72) Inventor: Zhicheng Zhou, Jiangsu (CN)

(73) Assignee: WUXI ORG MICROELECTRONICS CO., LTD., Wuxi (CN)

( * ) Notice: Subject to any disclaimer, the term of this patent is extended or adjusted under 35 U.S.C. 154(b) by 181 days.

(21) Appl. No.: 16/578,275

(22) Filed: Sep. 20, 2019

(65) Prior Publication Data
US 2021/0022216 A1    Jan. 21, 2021

(30) Foreign Application Priority Data

Jul. 19, 2019    (CN) .................. 201910654733.X

(51) Int. Cl.
| | |
|---|---|
| H05B 33/08 | (2020.01) |
| H05B 45/20 | (2020.01) |
| H05B 45/395 | (2020.01) |
| H05B 45/37 | (2020.01) |
| H05B 45/10 | (2020.01) |

(52) U.S. Cl.
CPC .......... *H05B 45/20* (2020.01); *H05B 45/10* (2020.01); *H05B 45/37* (2020.01); *H05B 45/395* (2020.01)

(58) Field of Classification Search
CPC ....... H05B 45/10; H05B 45/20; H05B 45/395
See application file for complete search history.

(56) References Cited

U.S. PATENT DOCUMENTS

| | | | | |
|---|---|---|---|---|
| 10,721,801 B1* | 7/2020 | Price | ..................... | H05B 45/42 |
| 10,750,592 B1* | 8/2020 | Price | ..................... | H05B 45/42 |
| 11,019,694 B2* | 5/2021 | Mai | ....................... | H05B 45/46 |
| 2012/0081009 A1* | 4/2012 | Shteynberg | ............ | H05B 45/36 |
| | | | | 315/122 |
| 2014/0300274 A1* | 10/2014 | Acatrinei | ............. | H05B 45/382 |
| | | | | 315/85 |

(Continued)

FOREIGN PATENT DOCUMENTS

| | | |
|---|---|---|
| CN | 204437827 U | 7/2015 |
| CN | 105191496 A | 12/2015 |
| CN | 109076663 A | 12/2018 |

*Primary Examiner* — Andrew J Coughlin

(57) ABSTRACT

The present invention provides a circuit for linearly driving LED illumination based on MCU-controlled color temperature switching, comprising an SCM color temperature control module, an LED linear dimming driving and control module and an LED illumination module. The SCM color temperature control module may output two PWM signals, to adjust the ratio of current at the LED bead strings, thus to synthesize two or more different color temperatures. Or, the SCM color temperature control module outputs multi-channel control signals and then controls a color temperature output module to control the ratio of current at the LED bead strings at high and low color temperatures, thus to realize two or more color temperatures. Furthermore, a memory function or a non-memory function can be realized, if desired. The LED linear dimming driving and control module can control and adjust the illuminance of the LED illumination module, and can realize a dimming function.

9 Claims, 4 Drawing Sheets

(56) References Cited

U.S. PATENT DOCUMENTS

2016/0255683 A1\* 9/2016 Wu .................. H05B 47/20
                                              315/192
2017/0006684 A1\* 1/2017 Tu ..................... H05B 45/48
2018/0027626 A1   1/2018 Wang et al.

\* cited by examiner

CIRCUIT FOR LINEARLY DRIVING LED ILLUMINATION BASED ON MCU-CONTROLLED COLOR TEMPERATURE SWITCHING

CROSS-REFERENCE TO RELATED APPLICATIONS

This application claims the benefit of priority from Chinese Patent Application No. CN 201910654733.X, filed on Jul. 20, 2019. The content of the aforementioned application, including any intervening amendments thereto, is incorporated herein by reference in its entirety.

TECHNICAL FIELD

The present invention relates to a circuit for linearly driving LED illumination based on MCU-controlled color temperature switching.

BACKGROUND OF THE PRESENT INVENTION

Linearly driving LED illumination, which is applied for circuit simplification and works in a power-frequency mode without high-frequency interference, is gradually popular among customers.

In recent years, LED lamps have been widely applied as illumination power supplies. With the increased demands for LED illumination power supplies and the development of the LED technology, LED illumination power supplies with adjustable illuminance and color temperature have become a new development trend. In the case of linearly driven LED illumination, the combination of MCU-controlled color temperature switching and silicon-controlled dimming has long been expected by users.

SUMMARY OF THE PRESENT INVENTION

The purpose of the present invention is to solve, to some extent, one of the technical problems described above or at least provide a useful commercial choice. For this purpose, the present invention provides a circuit for linearly driving light-emitting diode (LED) illumination based on Micro-Controller Unit (MCU)-controlled color temperature switching, comprising an Single Chip Microcomputer (SCM) color temperature control module, an LED linear dimming driving and control module and an LED illumination module. The SCM color temperature control module may output two PWM signals, to adjust the ratio of current at the LED bead strings, thus to synthesize two or more different color temperatures. Or, the SCM color temperature control module generates multi-channel control signals and then controls a multi-channel color temperature control module to control the ratio of current at the LED bead strings at high and low color temperatures, thus to realize two or more color temperatures. Furthermore, a memory function or a non-memory function can be realized, if desired. The LED linear dimming driving and control module can control and adjust the illuminance of the LED illumination module, and can realize a dimming function. This circuit is simple in structure, and can adjust the color temperature and the illuminance of the LED illumination module. This is convenient for users and improves the user experience.

The circuit for linearly driving LED illumination based on MCU-controlled color temperature switching according to the present invention comprises an SCM color temperature control module, an LED linear dimming driving and control module and an LED illumination module. The SCM color temperature control module may output two PWM signals, to adjust the ratio of current at the LED bead strings, thus to synthesize two or more different color temperatures. Or, the SCM color temperature control module generates multi-channel control signals and then controls a multi-channel color temperature control module to control the ratio of current at the LED bead strings at high and low color temperatures, thus to realize two or more color temperatures. Furthermore, a memory function or a non-memory function can be realized, if desired. The LED linear dimming driving and control module can control and adjust the illuminance of the LED illumination module, and can realize a silicon-controlled dimming function. This circuit is simple in structure, and can adjust the color temperature and the illuminance of the LED illumination module. This is convenient for users and improves the user experience.

In addition, the circuit for linearly driving LED illumination based on MCU-controlled color temperature switching according to the present invention may have following additional technical features.

The LED illumination module comprises an LED bead string at a high color temperature and an LED bead string at a low color temperature.

The SCM input control module comprises at least one of a power switch control module, a DIP switch control module, a key control module, a wireless/WIFI control module, a human body sensing control module, an IR/RF remote control module, a touch control module and a sound control module.

The SCM color temperature control module outputs two PWM signals, to adjust the ratio of current at the LED bead string at a high color temperature and current at the LED bead string at a low color temperature, thus to generate at least two different color temperatures.

The SCM color temperature control module is configured to generate multi-channel control signals, and control the ratio of current at the LED bead string at a high color temperature and current at the LED bead string at a low color temperature by the multi-channel control signals, thus to generate at least two different color temperatures.

The LED linear dimming driving and control module is configured to regulate the power of the LED illumination module, and control trimming of the LED bead string at a high color temperature and the LED bead string at a low color temperature after the ratio of current at the LED bead string at a high color temperature and current at the LED bead string at a low color temperature is well configured.

A power supply module is further provided between an AC rectifier module and the LED illumination module, the power supply module comprising a first dropping resistor connected to the LED illumination module and a first voltage regulator connected to a virtual ground (GND). A first node is provided between the first dropping resistor and a cathode input end of the first voltage regulator, an anode of the first voltage regulator is a second node, and an electrolytic capacitor is provided between the first node and the second node. An anode of the electrolytic capacitor is connected to the first node and a cathode of the electrolytic capacitor is connected to the second node. The first node is an anode input end of a SCM power supply and the second node is a virtual power GND.

A first fast recovery diode is provided between a rectifier bridge and the LED bead strings at high and low color temperatures.

A first switch control unit is provided between the LED bead string at a low color temperature and the SCM color temperature control module and a second switch control unit is provided between the LED bead string at a high color temperature and the SCM color temperature control module; the first switch control unit comprises a first Metal Oxide Semiconductor (MOS) transistor having a drain connected to the LED bead string at a low color temperature, a gate connected to the SCM color temperature control module, and a source connected to the virtual GND, and a first resistor having an end connected to the gate of the first MOS transistor and the other end connected to the source of the first MOS transistor; and the second switch control unit comprises a second MOS transistor having a drain connected to the LED bead string at a high color temperature, a gate connected to the SCM color temperature control module, and a source connected to the virtual GND, and a second resistor having an end connected to the gate of the second MOS transistor and the other end connected to the source of the second MOS transistor.

The SCM color temperature control module generates multi-channel color temperature control signals and then realizes adjustment of the ratio of current at the bead strings at high and low color temperatures by the color temperature output control module, thus to realize the control of two or more color temperatures.

The AC power supply module supplies 120V AC power or 230V AC power.

Additional aspects and advantages of the present invention will be given in the following description, some of which will become apparent from the following description or appreciated by implementing the present invention.

BRIEF DESCRIPTION OF THE DRAWINGS

The above and/or additional aspects and advantages of the present invention will become apparent and be readily understood from the following description of embodiments with reference to the accompanying drawings.

DETAILED DESCRIPTION OF THE PRESENT INVENTION

Figure 1:
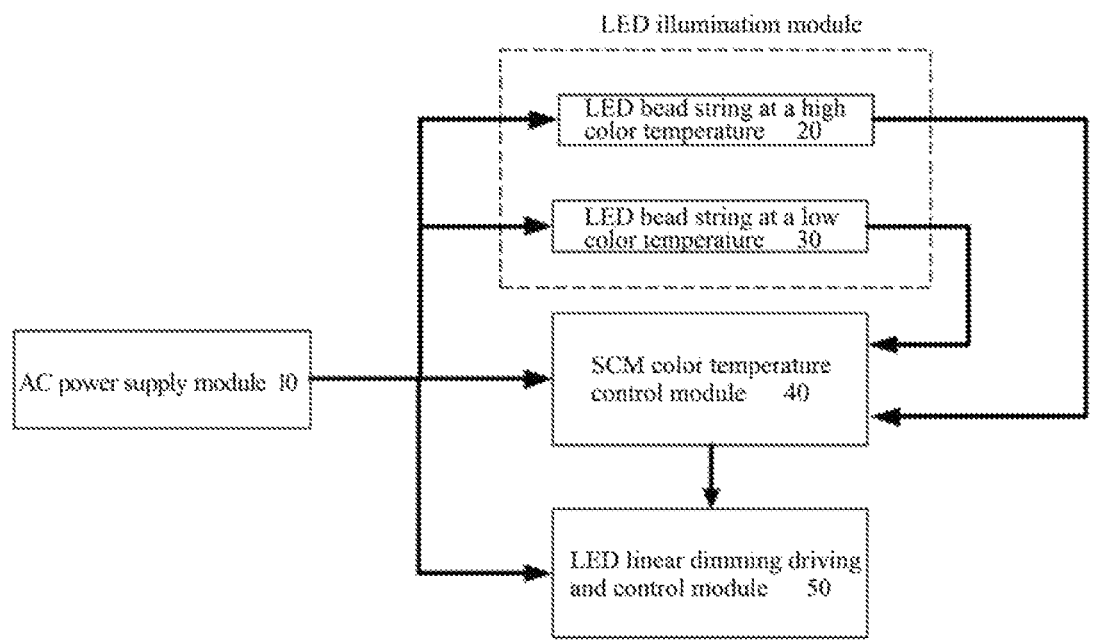
FIG. 1 is a structural block diagram of a circuit for linearly driving LED illumination based on MCU-controlled color temperature switching, in an embodiment of the present invention.

Embodiments of the present invention will be described below in detail. Examples of the embodiments to be described are shown in the drawings. Throughout the drawings, same or similar reference numerals represent same or similar elements or elements having a same or similar function. The embodiments to be described with reference to the accompanying drawings are exemplary, and are intended to explain the present invention rather than limiting the present invention.

Figure 2:
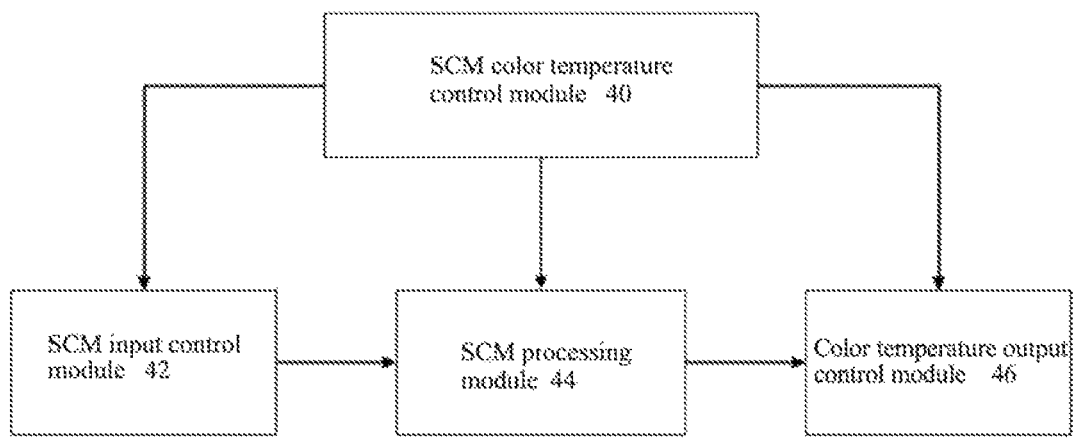
FIG. 2 is a structural block diagram of an SCM color temperature control module, in an embodiment of the present invention.
Figure 3:
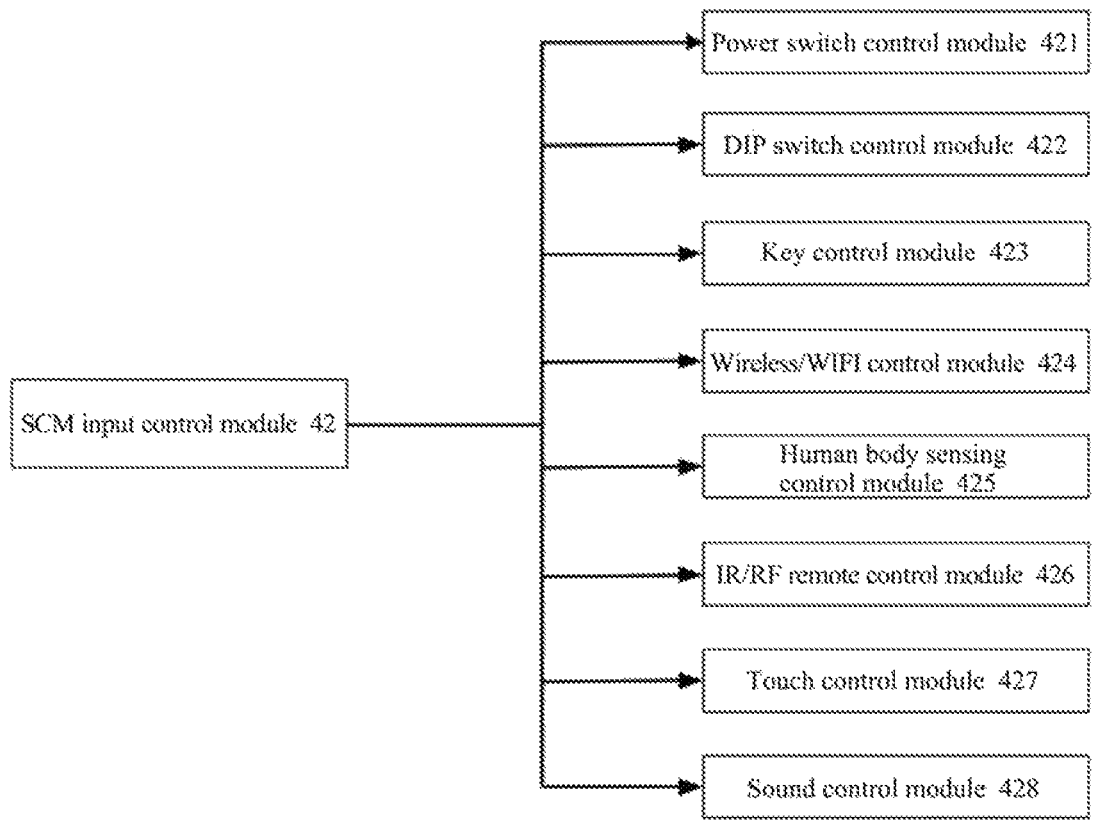
FIG. 3 is a structural block diagram of an SCM input control module, in an embodiment of the present invention.
Figure 4:
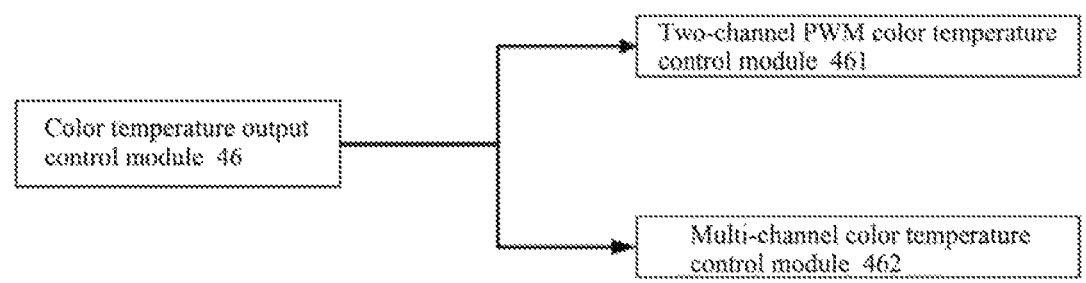
FIG. 4 is a structural block diagram of an color temperature output control module, in an embodiment of the present invention.
Figure 5:
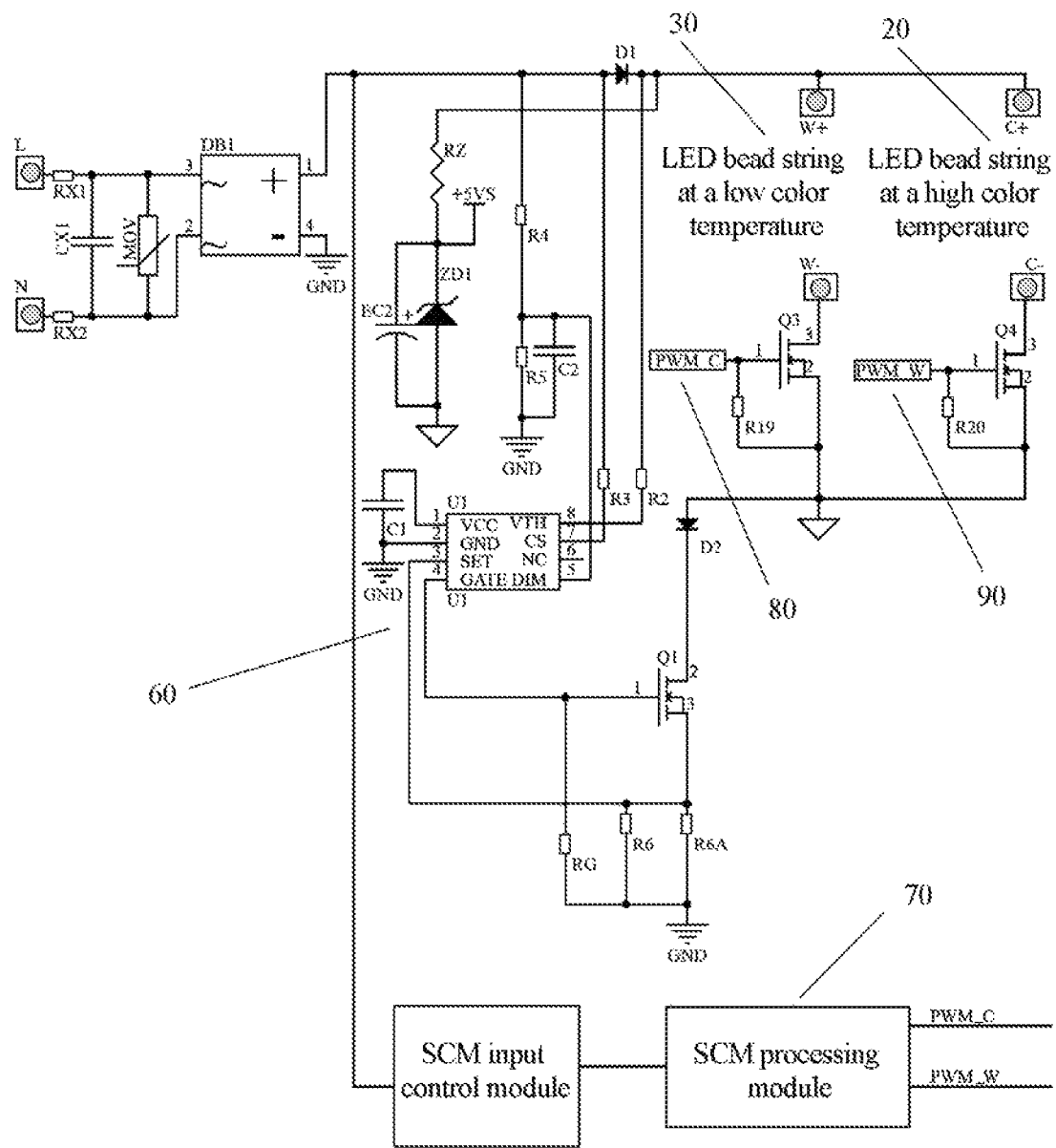
FIG. 5 is a circuit diagram of a circuit for linearly driving LED illumination based on MCU-controlled color temperature switching, in an embodiment of the present invention.
Figure 6:
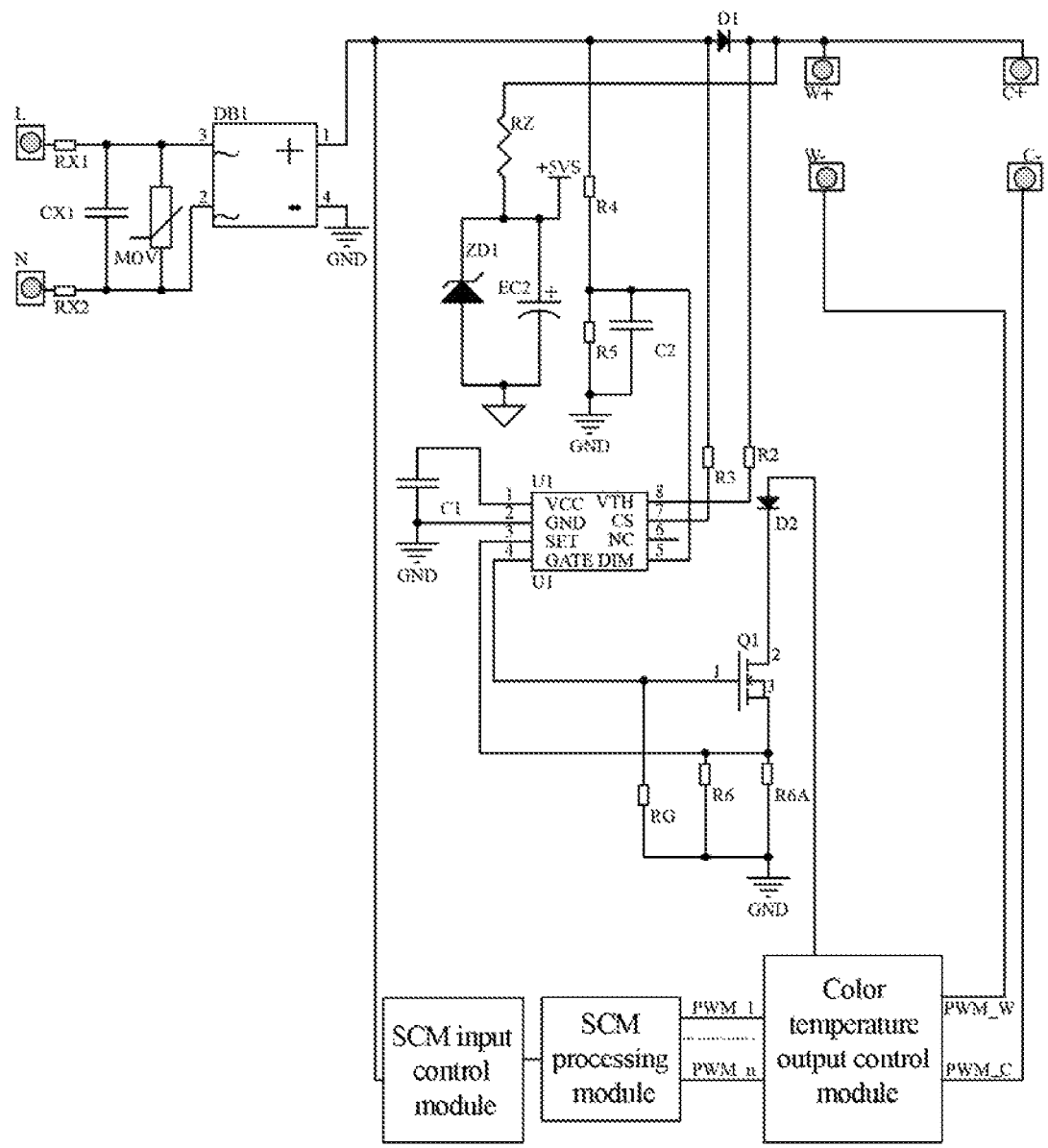
FIG. 6 is a circuit diagram of a circuit for linearly driving LED illumination based on MCU-controlled color temperature switching, in another embodiment of the present invention.

FIG. 1 is a structural block diagram of a circuit for linearly driving LED illumination based on MCU-controlled color temperature switching, in an embodiment of the present invention; FIG. 2 is a structural block diagram of an SCM color temperature control module, in an embodiment of the present invention; FIG. 3 is a structural block diagram of an SCM input control module, in an embodiment of the present invention; FIG. 4 is a structural block diagram of an color temperature output control module, in an embodiment of the present invention; FIG. 5 is a circuit diagram of a circuit for linearly driving LED illumination based on MCU-controlled color temperature switching, in an embodiment of the present invention; and FIG. 6 is a circuit diagram of a circuit for linearly driving LED illumination based on MCU-controlled color temperature switching, in another embodiment of the present invention. Referring to FIGS. 1-6, the present invention provides a circuit for linearly driving LED illumination based on MCU-controlled color temperature switching, which is applied in the linear driving of LED illumination. Both a linear driving circuit and a color temperature adjustment circuit can be realized, and a dimming function can also be realized.

The circuit for linearly driving LED illumination based on MCU-controlled color temperature switching comprises an AC power supply module 10, an LED illumination module, an SCM color temperature control module 40, and an LED linear dimming driving and control module 50.

The AC power supply module 10 is configured to supply AC power for the circuit. In the specific implementation, the AC power supply module 10 can supply 120V or 230V AC power. In the present invention, as an example, the AC power supply module 10 supplies 120V AC power. The AC power supply module 10 has two voltage input ends, respectively: a live wire end (marked as L) and a neutral wire end (marked as N).

The LED illumination module is connected to the AC power supply module 10. The LED illumination module comprises at least two LED bead strings at different color temperatures. In the present invention, referring to FIG. 1 and FIG. 5, the LED illumination module comprises an LED bead string 20 at a high color temperature and an LED bead string 30 at a low color temperature. An anode of the LED bead string 20 at a high color temperature is connected in parallel to an anode of the LED bead string 30 at a low color temperature.

The SCM color temperature control module 40 is connected to the AC power supply module 10, the LED illumination module, and an LED linear dimming driving and control module, respectively. Referring to FIG. 2, the SCM color temperature control module 40 comprises an SCM input control module 42, an SCM processing module 44 and a color temperature output control module 46. The SCM input control module 42 is configured to generate an enable signal to trigger the operation of the SCM processing module. The SCM processing module 44 outputs two PWM control signals upon receiving the enable signal, to adjust the ratio of current at the LED bead strings at high and low color temperatures, thus to control the LED illumination module to generate two or more color temperatures. Or, after the color temperature output control module 46 receives the output signal from the SCM processing module 44, the SCM processing module 44 controls the ratio of current at the LED bead strings at high and low color temperatures, thus to control the LED illumination module to generate two or more color temperatures. In the specific implementation, when the LED illumination module is to be turned on, the color temperature of the LED illumination module can be controlled by triggering the SCM input control module 42. The SCM input control module 42 generates, upon receiving different types of triggering, an enable signal and transmits the enable signal to the SCM processing module 44. The SCM processing module 44 generates, upon receiving the enable signal and according to this requirement, two PWM control signals or multi-channel control signals (that can control the color temperature output control module 46), to control the ratio of current at the two LED bead strings at different color temperatures, thus to control the LED illumination module to generate two or more different color temperatures.

The LED linear dimming driving and control module 50 is connected to the AC power supply module 10 and the SCM color temperature control module 40, and configured to control and adjust the illuminance of the LED illumination module. Specifically, the LED linear dimming driving and control module 50 is configured to adjust the illuminance of the LED bead string 20 at a high color temperature and the LED bead string 30 at a low color temperature, so that the LED illumination module exhibits different illuminance at a specific color temperature. Meanwhile, a dimming function can also be realized.

The circuit for linearly driving LED illumination based on MCU-controlled color temperature switching in the present invention comprises an SCM color temperature control module 40, an LED linear dimming driving and control module 50 and an LED illumination module. By the circuit for linearly driving LED illumination based on MCU-controlled color temperature switching, change between two or more color temperatures can be realized. Furthermore, a memory function or a non-memory function can be realized, if desired. The LED linear dimming driving and control module 50 can control and adjust the illuminance of the LED illumination module and realize a dimming function. This circuit is simple in structure, and can adjust the color temperature and the illuminance of the LED illumination module. This is convenient for users and improves the user experience.

In the specific implementation, referring to FIG. 3, the SCM input control module 42 comprises at least one of a power switch control module 421, a DIP switch control module 422, a key control module 423, a wireless/WIFI control module 424, a human body sensing control module 425, an IR/RF remote control module 426, a touch control module 427 and a sound control module 428. That is, in the circuit for linearly driving LED illumination based on MCU-controlled color temperature switching provided in the present invention, the SCM input control module 42 can use one, two or more of the above control modes. Specifically, the LED bead string 20 at a high color temperature and the LED bead string 30 at a low color temperature in the LED illumination module are connected to the AC power supply module 10. After the LED illumination module receives the voltage input by the AC power supply module 10, by the SCM input module, the ratio of current at the lead strings at high and low color temperatures can be controlled in various different modes such as power switch, DIP switch, key, wireless/WIFI, human body sensing, IR/RF remote control, touch control and sound control, to synthesize the desired two or more different color temperatures.

In the specific implementation, referring to FIG. 4, the color temperature output control module 46 comprises a two-channel PWM color temperature control module 461 and a multi-channel color temperature control module 462. That is, the color temperature output control module 46 in the present invention provides two output modes for regulating the color temperature of the LED illumination module.

In the specific implementation, referring to FIG. 5, the SCM color temperature control module 40 outputs two PWM signals, to adjust the ratio of current at the LED bead string 20 at a high color temperature and current at the LED bead string 30 at a low color temperature, thus to generate at least two different color temperatures. Specifically, the SCM color temperature control module 40 is connected to the LED bead string 20 at a high color temperature and the LED bead string 30 at a low color temperature in the LED illumination module, and the LED linear dimming driving and control module 50, respectively, to control the ratio of current at the two LED bead strings at high and low color temperatures. That is, the SCM color temperature control module 40 is configured to control the combination of all different LED color temperatures included in the LED bead string 20 at a high color temperature and the LED bead string 30 at a low color temperature in the LED illumination module. Due to the relation between the color temperature and the current of the two LED bead strings, by the control of the SCM color temperature control module 40, the respective ratio of current at the LED bead string 20 at a high color temperature and current at the LED bead string 30 at a low color temperature in the LED illumination module can be controlled. Thus, the change between two or more color temperatures can be realized. Furthermore, a memory function or a non-memory function in the color temperature state can be realized, to exhibit light at different color temperatures. The users are provided with dazzling visual experience and portable operating experience. The user experience is improved.

In the specific implementation, referring to FIG. 2, the SCM color temperature control module 40 generates, controls and outputs multi-channel control signals, and then controls the ratio of current at the LED bead string 20 at a high color temperature and current at the LED bead string 30 at a low color temperature by the multi-channel control signals, thus to generate at least two different color temperatures.

Specifically, the SCM color temperature control module regulates the ratio of current at the LED bead string 20 at a high color temperature and current at the LED bead string 30 at a low color temperature, to combine two or more color temperatures. The specific implementation mode may be provided by the SCM input control module 42. Various different modes such as power switch, DIP switch, key, wireless/WIFI, human body sensing, IR/RF remote control, touch control and sound control can be realized. Furthermore, a memory function can also be realized.

In the specific implementation, the LED linear dimming driving and control module 50 is configured to regulate the power of the LED illumination module, and control trimming of the LED bead string 20 at a high color temperature and the LED bead string 30 at a low color temperature after the ratio of current at the LED bead string 20 at a high color temperature and current at the LED bead string 30 at a low color temperature is well configured. Specifically, the LED linear dimming driving and control module 50 is connected to the AC power supply module 10 and the SCM color temperature control module 40, and configured to control and adjust the illuminance of the LED bead string 20 at a high color temperature and the LED bead string 30 at a low color temperature in the LED illumination module. That is, the LED linear dimming driving and control module 50 is configured to realize adjustment of the illuminance of the LED bead string 20 at a high color temperature and the LED bead string 30 at a low color temperature in the LED illumination module, so that the LED illumination module exhibits different illuminance at a specific color temperature.

In the specific implementation, referring to FIG. 5 and FIG. 6, an AC rectifier module is further provided between the AC power supply module 10 and the LED illumination module. The AC rectifier module comprises a first filter resistor RX1 connected to a live wire (marked as L), a second filter resistor RX2 connected to a neutral wire (marked as N), a filter capacitor CX1 respectively connected to the first filter resistor RX1 and the second filter resistor RX2, a piezoresistor MOV connected in parallel to the filter capacitor CX1, and a rectifier bridge DB1 respectively connected to the first filter resistor RX1 and the second filter resistor RX2. A third node is provided between the first filter resistor RX1 and an input end of the rectifier bridge DB1. A fourth node is provided between the second filter resistor RX2 and the other input end of the rectifier bridge DB1. The filter capacitor CX1 is arranged between the third node and the fourth node. A fifth node is provided between the third node and the input end of the rectifier bridge DB1. A sixth node is provided between the fourth node and the other input end of the rectifier bridge DB1. The piezoresistor MOV is arranged between the fifth node and the sixth node. An anode output end (+) of the rectifier bridge DB1 is connected to the first fast recovery diode D1, and a cathode of the first fast recovery diode D1 is connected to the LED bead string 30 at a low color temperature. A cathode output end (−) of the rectifier bridge DB1 is grounded.

In the specific implementation, referring to FIG. 5 and FIG. 6, the first fast recovery diode D1 is arranged between the rectifier bridge DB1 and the LED bead string 30 at a low color temperature.

In the specific implementation, referring to FIG. 5, a first switch control unit is provided between the LED bead string 30 at a low color temperature and the SCM color temperature control module 40 and a second switch control unit is provided between the LED bead string 20 at a high color temperature and the SCM color temperature control module 40. The first switch control unit comprises a first MOS transistor Q3 having a drain connected to the LED bead string 30 at a low color temperature, a gate connected to the SCM color temperature control module 40, and a source connected to the virtual GND, and a first resistor R19 having an end connected to the gate of the first MOS transistor Q3 and the other end connected to the source of the first MOS transistor Q3. The second switch control unit comprises a second MOS transistor Q4 having a drain connected to the LED bead string 20 at a high color temperature, a gate connected to the SCM color temperature control module 40, and a source connected to the virtual GND, and a second resistor R20 having an end connected to the gate of the second MOS transistor Q4 and the other end connected to the source of the second MOS transistor Q4.

In the description of this specification, reference terms of "one embodiment", "some embodiments", "an example", "a specific example", or "some examples" are intended to indicate that specific features, structures, materials, or characteristics described with reference to the embodiment or example are included in at least one embodiment or example of the present invention. In this specification, the exemplary descriptions of the above terms do not necessarily mean a same embodiment or example. In addition, the specific features, structures, materials, or characteristics that are described may be combined in a proper manner in any one or more embodiments or examples.

Although the embodiments of the present invention have been shown and described above, it may be understood that the above embodiments are exemplary and cannot be understood as limitations to the present invention. A person of ordinary skill in the art may make changes, modifications, replacements, and variations to the above embodiments within the scope of the present invention, without departing from the principle and gist of the present invention.

What is claimed is:

1. A circuit for linearly driving light-emitting diode (LED) illumination based on Micro-Controller Unit (MCU)-controlled color temperature switching, comprising:
   an AC power supply module, configured to supply an input voltage;
   an LED illumination module connected to the AC power supply module and an Single Chip Microcomputer (SCM) color temperature control module, comprising at least two LED bead strings at different color temperatures;
   the SCM color temperature control module, connected to the Alternating Current (AC) power supply module, an LED linear dimming driving and control module, and the LED illumination module, respectively, comprising an SCM input control module, an SCM processing module and a color temperature output control module, wherein the SCM input control module is configured to generate an enable signal to trigger the operation of the SCM processing module, the SCM processing module performs corresponding processing upon receiving the enable signal and controls the color temperature output control module, the color temperature output control module may output two Pulse-Width Modulation (PWM) control signals or multi-channel control signals, to control the ratio of current at the LED bead strings at high and low color temperatures, thus to realize the control of two or more color temperatures; and
   the LED linear dimming driving and control module, connected to the AC power supply module and the SCM color temperature control module, configured to control and adjust the illuminance of the LED illumination module and to realize a dimming function,
   wherein the LED illumination module comprises an LED bead string at a high color temperature and an LED bead string at a low color temperature,
   wherein the SCM color temperature control module outputs multi-channel control signals, and controls the ratio of current at the LED bead string at a high color temperature and current at the LED bead string at a low color temperature by the multi-channel control signals, thus to generate at least two different color temperatures.

2. The circuit for linearly driving LED illumination based on MCU-controlled color temperature switching according to claim 1, wherein the SCM input control module comprises at least one of a power switch control module, a dual in-line package (DIP) switch control module, a key control module, a wireless/WIFI control module, a human body sensing control module, an IR/RF remote control module, a touch control module and a sound control module.

3. The circuit for linearly driving LED illumination based on MCU-controlled color temperature switching according to claim 1, wherein the SCM color temperature control module outputs two PWM signals, to adjust the ratio of current at the LED bead string at a high color temperature and current at the LED bead string at a low color temperature, thus to generate at least two different color temperatures.

4. The circuit for linearly driving LED illumination based on MCU-controlled color temperature switching according to claim 3, wherein the LED linear dimming driving and control module is configured to regulate the power of the LED illumination module, and control trimming of the LED bead string at a high color temperature and the LED bead string at a low color temperature after the ratio of current at the LED bead string at a high color temperature and current at the LED bead string at a low color temperature is well configured.

5. The circuit for linearly driving LED illumination based on MCU-controlled color temperature switching according to claim 3, wherein a first switch control unit is provided between the LED bead string at a low color temperature and the SCM color temperature control module and a second switch control unit is provided between the LED bead string at a high color temperature and the SCM color temperature control module; the first switch control unit comprises a first Metal Oxide Semiconductor (MOS) transistor having a drain connected to the LED bead string at a low color temperature, a gate connected to the SCM color temperature control module, and a source connected to the virtual GND, and a first resistor having an end connected to the gate of the first MOS transistor and the other end connected to the source of the first MOS transistor; and the second switch control unit comprises a second MOS transistor having a drain connected to the LED bead string at a high color temperature, a gate connected to the SCM color temperature control module, and a source connected to the virtual GND, and a second resistor having an end connected to the gate of the second MOS transistor and the other end connected to the source of the second MOS transistor.

6. The circuit for linearly driving LED illumination based on MCU-controlled color temperature switching according to claim 1, wherein a power supply module is further provided between an AC rectifier module and the LED illumination module, the power supply module comprising a first dropping resistor connected to the LED illumination module and a first voltage regulator connected to a virtual ground (GND); a first node is provided between the first dropping resistor and a cathode input end of the first voltage regulator, an anode of the first voltage regulator is a second node, and an electrolytic capacitor is provided between the first node and the second node; an anode of the electrolytic capacitor is connected to the first node and a cathode of the electrolytic capacitor is connected to the second node; and the first node is an anode input end of a SCM power supply and the second node is a virtual power GND.

7. The circuit for linearly driving LED illumination based on MCU-controlled color temperature switching according to claim 6, wherein a first fast recovery diode is provided between a rectifier bridge and the LED bead strings at high and low color temperatures.

8. The circuit for linearly driving LED illumination based on MCU-controlled color temperature switching according to claim 1, wherein the SCM color temperature control module generates multi-channel color temperature control signals and then realizes adjustment of the ratio of current at the bead strings at high and low color temperatures by the color temperature output control module, thus to realize the control of two or more color temperatures.

9. The circuit for linearly driving LED illumination based on MCU-controlled color temperature switching according to claim 1, wherein the AC power supply module supplies 120V AC power or 230V AC power.

* * * * *